(12) United States Patent
Ichikawa et al.

(10) Patent No.: US 9,172,868 B2
(45) Date of Patent: Oct. 27, 2015

(54) IMAGING DEVICE, IMAGING METHOD AND STORAGE MEDIUM FOR COMBINING IMAGES CONSECUTIVELY CAPTURED WHILE MOVING

(71) Applicant: CASIO COMPUTER CO., LTD., Tokyo (JP)

(72) Inventors: Erina Ichikawa, Sagamihara (JP); Jun Muraki, Hamura (JP); Hiroshi Shimizu, Tachikawa (JP); Hiroyuki Hoshino, Ome (JP); Hiroyuki Kato, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 347 days.

(21) Appl. No.: 13/652,646

(22) Filed: Oct. 16, 2012

(65) Prior Publication Data

US 2013/0093840 A1    Apr. 18, 2013

(30) Foreign Application Priority Data

Oct. 18, 2011    (JP) ................. 2011-228561

(51) Int. Cl.
    *H04N 5/232* (2006.01)

(52) U.S. Cl.
    CPC ....... *H04N 5/23232* (2013.01); *H04N 5/23293* (2013.01); *H04N 5/23238* (2013.01); *H04N 5/23258* (2013.01)

(58) Field of Classification Search
    CPC .......... H04N 5/23232; H04N 5/23293; H04N 5/23258; H04N 5/23238; H04N 5/272; H04N 5/23245
    See application file for complete search history.

(56) References Cited

U.S. PATENT DOCUMENTS

| 5,510,830 A  * | 4/1996  | Ohia et al. ............... 348/36 |
| 5,699,108 A    | 12/1997 | Katayama et al. |
| 6,720,997 B1 * | 4/2004  | Horie et al. ............. 348/218.1 |

(Continued)

FOREIGN PATENT DOCUMENTS

| JP | 07-072600   A | 3/1995 |
| JP | 11-069293   A | 3/1999 |
| JP | 2003-163823 A | 6/2003 |
| JP | 2005-184533 A | 7/2005 |
| JP | 2008-263538 A | 10/2008 |
| JP | 2011199565  A | 10/2011 |

OTHER PUBLICATIONS

Machine English Translation of Noriyuki (JP 11-069293).*
Japanese Office Action dated Oct. 21, 2013 (and English translation thereof) in counterpart Japanese Application No. 2011-228561.
Japanese Office Action dated Jan. 6, 2014 in counterpart Japanese Application No. 2011-228561.

*Primary Examiner* — Behrooz Senfi
*Assistant Examiner* — Mohammed Jebari
(74) *Attorney, Agent, or Firm* — Holtz, Holtz, Goodman & Chick PC

(57) ABSTRACT

The present invention can easily acquire images having a uniform aspect ratio. In an imaging device of the invention, a control section detects the movement amount and the movement direction of the imaging device based on output from an acceleration sensor. Then, when the movement direction of the imaging device in its initial movement started at the beginning of imaging is substantially linear and a substantially horizontal or vertical direction, the control section calculates a reference movement amount by which a composite image having a predetermined aspect ratio can be generated, based on the movement amount of the imaging device, and controls the display section to display imaging area information (guide) indicating the final imaging area having the predetermined aspect ratio based on the reference movement amount.

16 Claims, 13 Drawing Sheets

(56) References Cited

U.S. PATENT DOCUMENTS

| | | |
|---|---|---|
| 6,867,801 B1 * | 3/2005 | Akasawa et al. ............ 348/222.1 |
| 7,136,096 B1 * | 11/2006 | Yamagishi et al. ......... 348/218.1 |
| 7,173,666 B1 * | 2/2007 | Masaki et al. ................ 348/445 |
| 8,068,694 B2 | 11/2011 | Zhang et al. |
| 2007/0081081 A1 * | 4/2007 | Cheng ........................ 348/218.1 |
| 2011/0228123 A1 | 9/2011 | Matsumoto et al. |
| 2012/0092522 A1 | 4/2012 | Zhang et al. |
| 2012/0257006 A1 * | 10/2012 | Matsumoto et al. ............ 348/36 |

\* cited by examiner

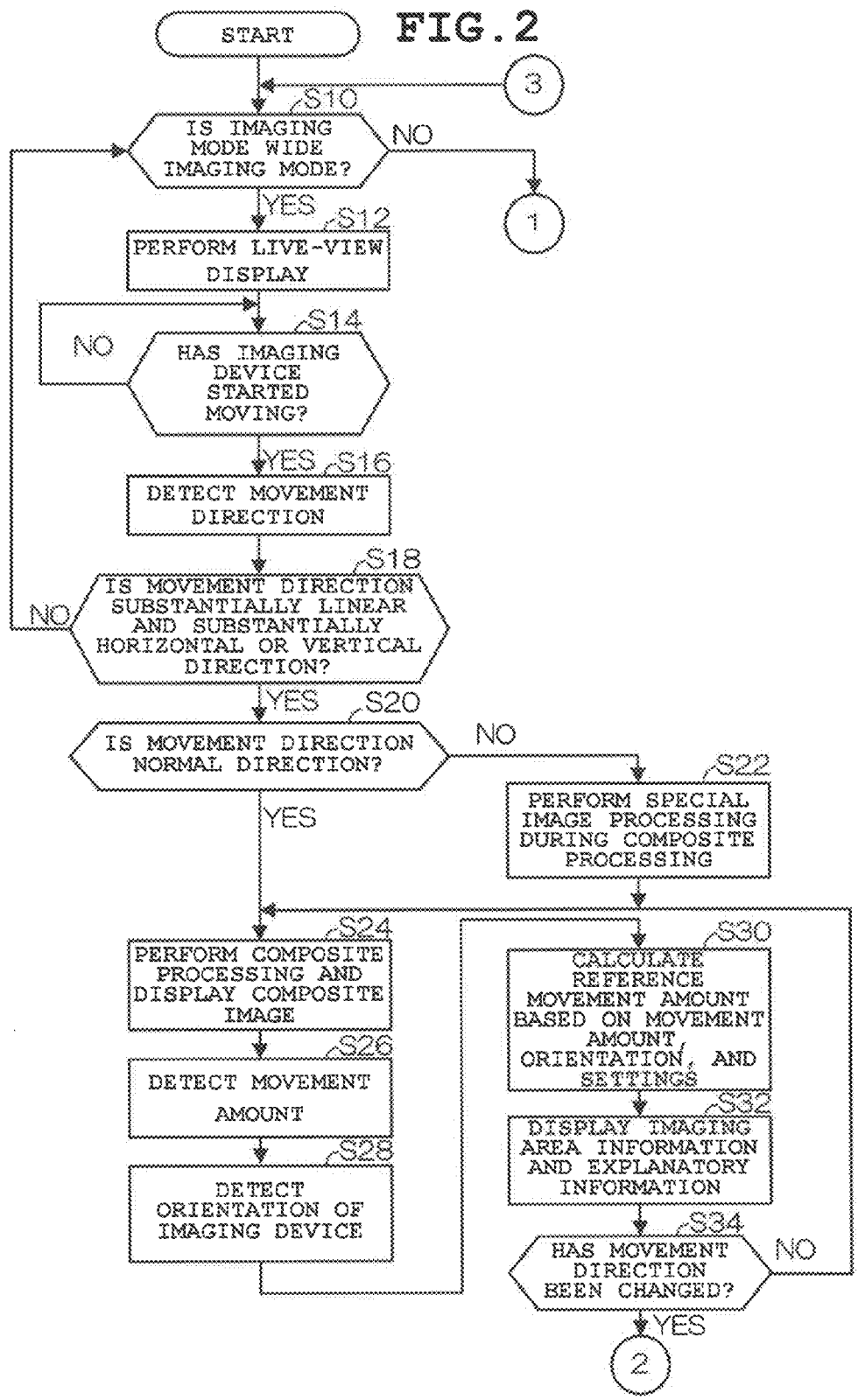

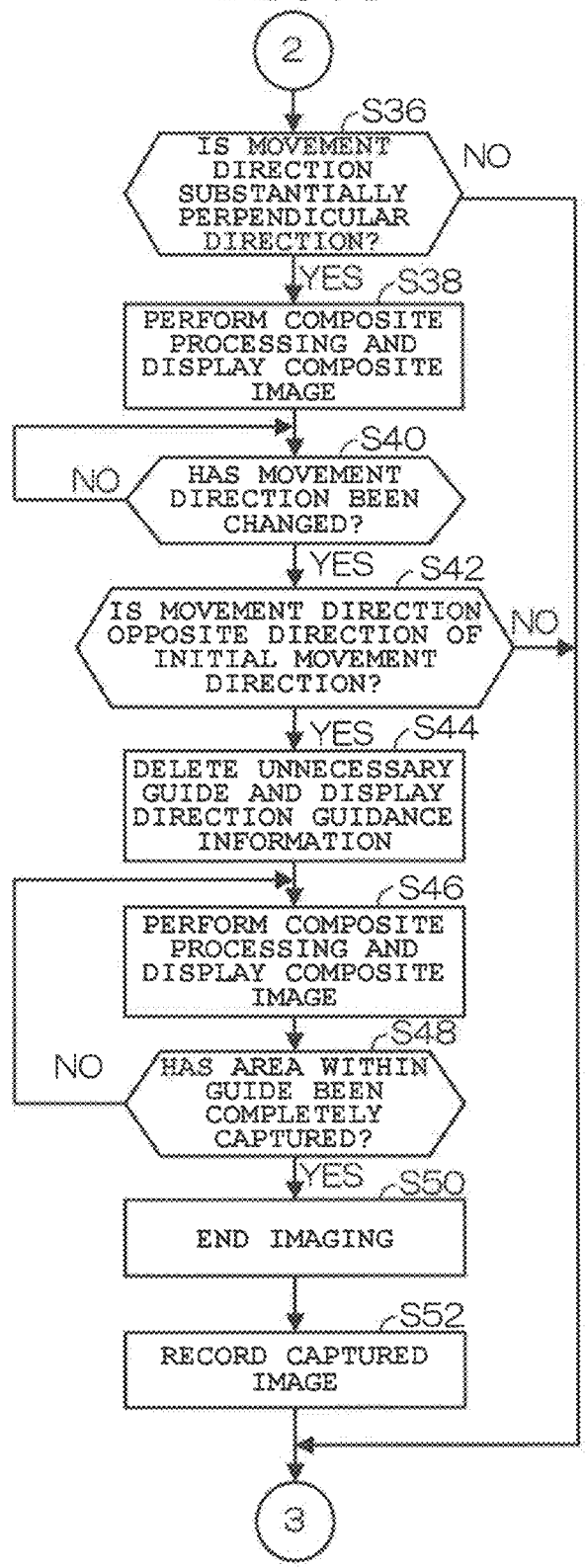

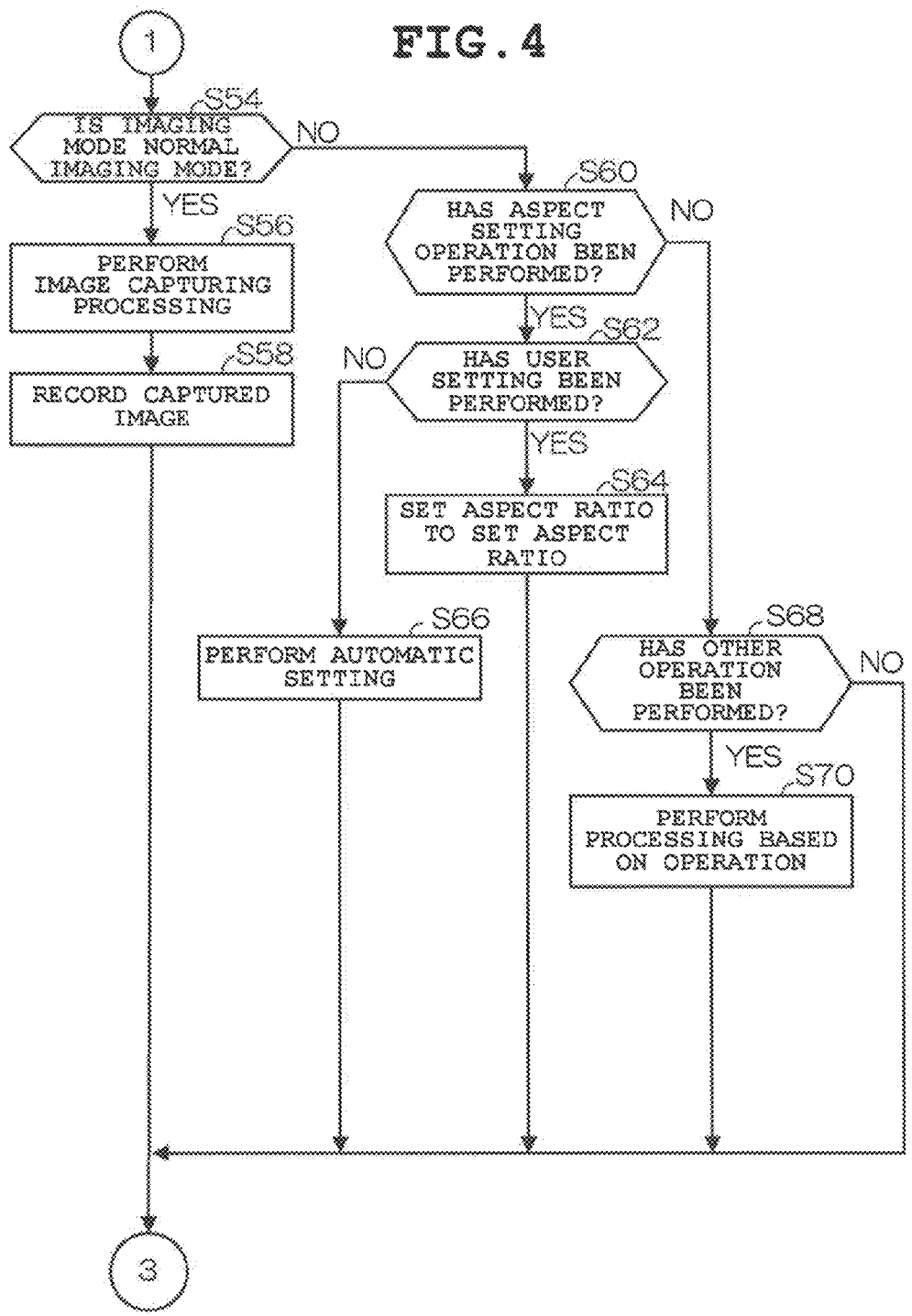

FIG.5A
LIVE-VIEW IMAGE BEFORE START OF MOVEMENT
FINAL COMPOSITE IMAGE
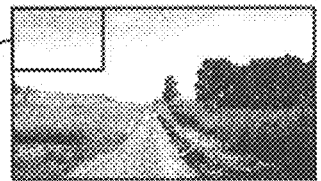
------> MOVEMENT DIRECTION
FIG.5B
START MOVEMENT
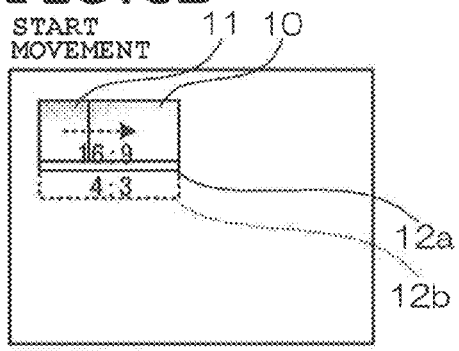
FIG.5E
STOP AT FURTHEST POSITION IN VERTICAL DIRECTION, MOVE IN OPPOSITE HORIZONTAL DIRECTION, AND DETERMINE ASPECT RATIO
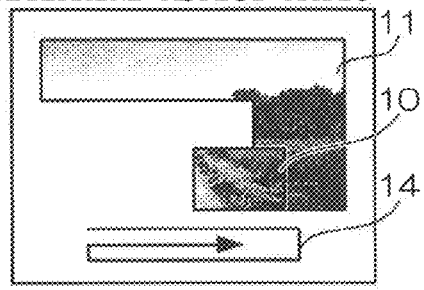
FIG.5C
STOP AT FURTHEST POSITION IN HORIZONTAL DIRECTION
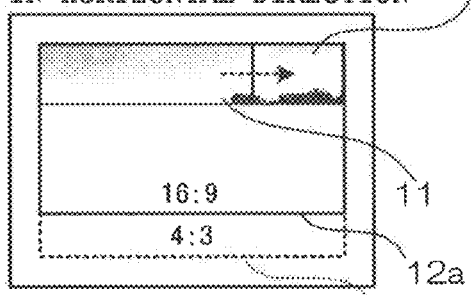
FIG.5F
CONTINUE MOVEMENT
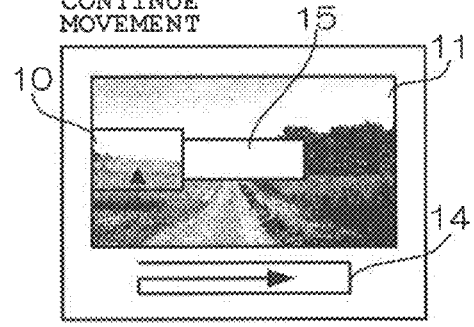
FIG.5D
MOVE IN VERTICAL DIRECTION
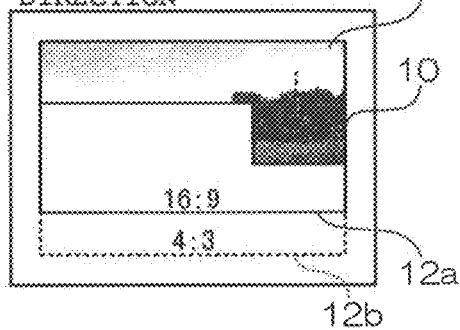
FIG.5G
END IMAGING
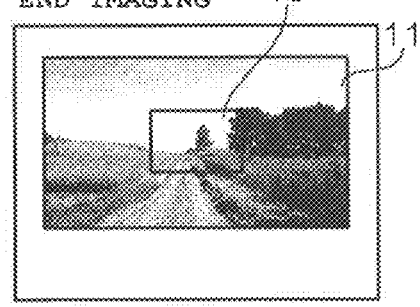

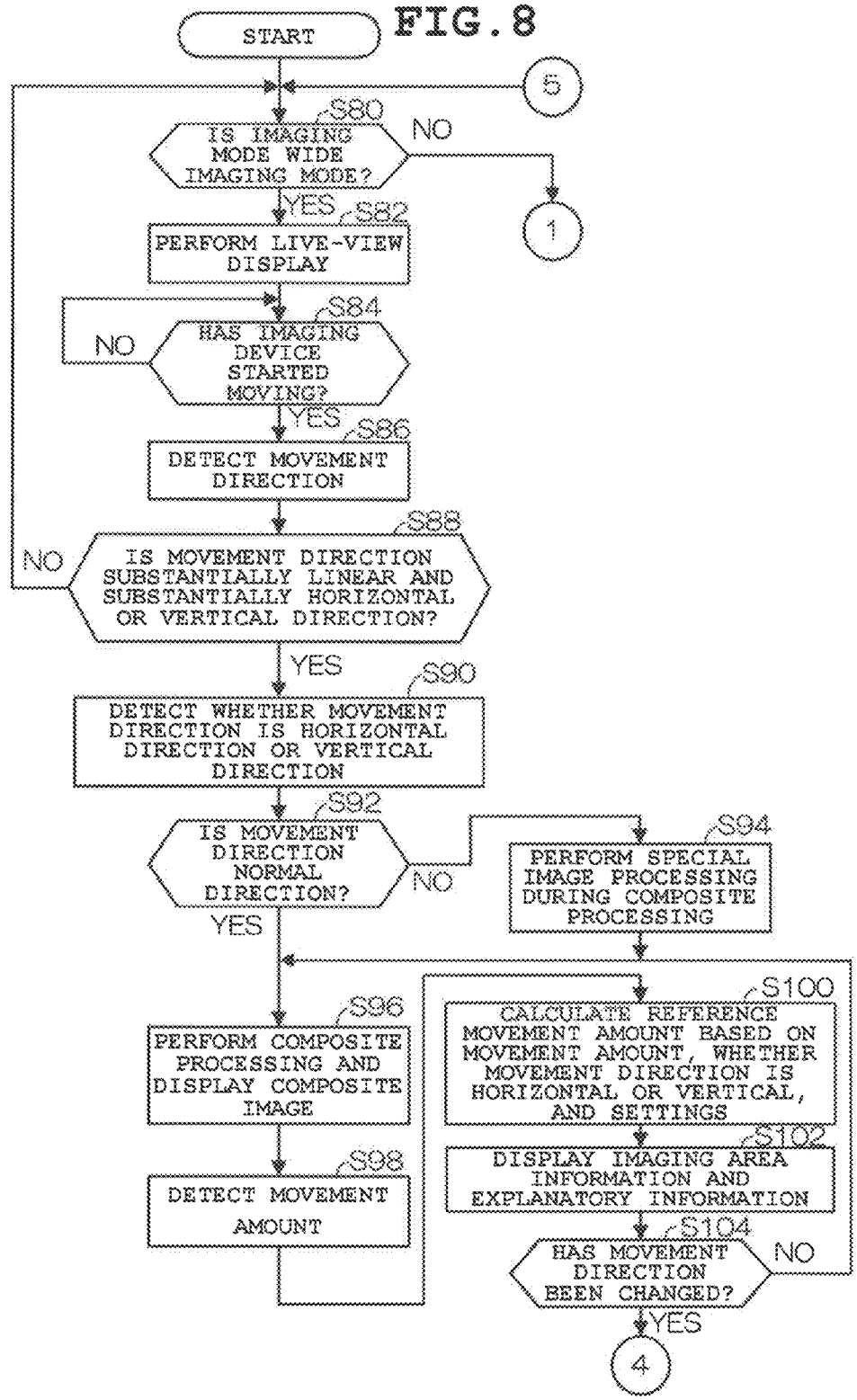

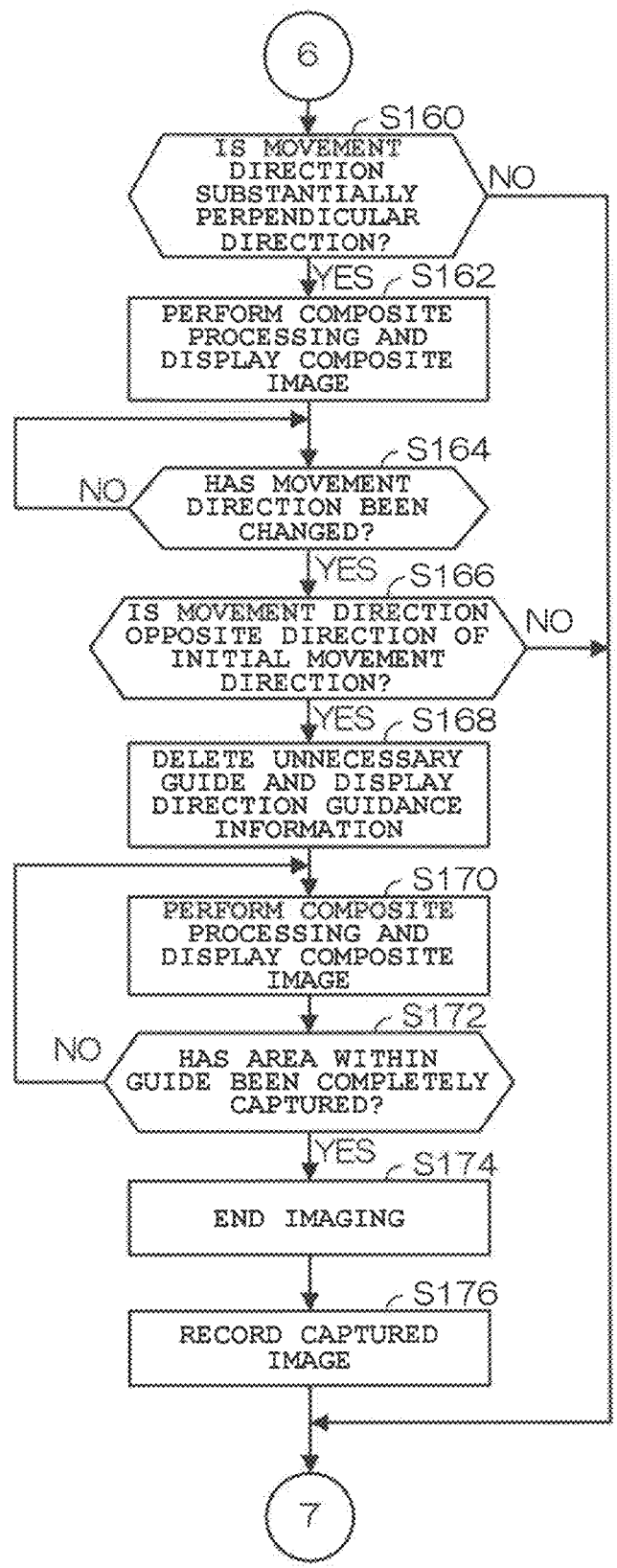

FIG.13A
LIVE-VIEW IMAGE BEFORE START OF MOVEMENT
FINAL COMPOSITE IMAGE
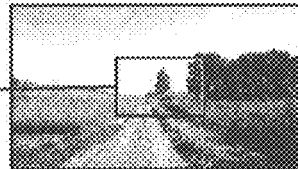
----▶ MOVEMENT DIRECTION
FIG.13B
DESIGNATE STARTING POSITION
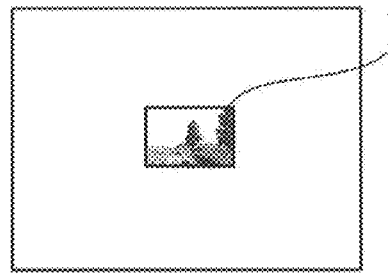
FIG.13E
STOP AT FURTHEST POSITION IN VERTICAL DIRECTION, MOVE IN OPPOSITE HORIZONTAL DIRECTION, AND DETERMINE ASPECT RATIO
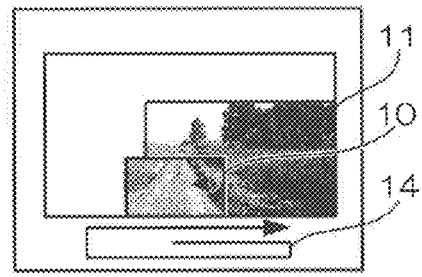
FIG.13C
STOP AT FURTHEST POSITION IN HORIZONTAL DIRECTION
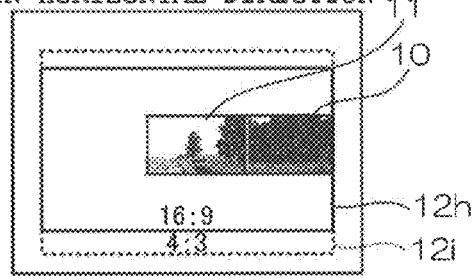
FIG.13F
CONTINUE MOVEMENT
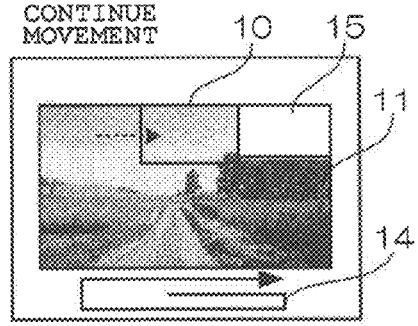
FIG.13D
MOVE IN VERTICAL DIRECTION
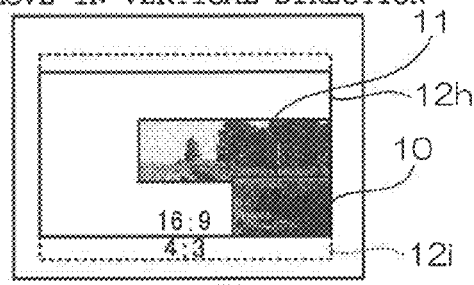
FIG.13G
END IMAGING
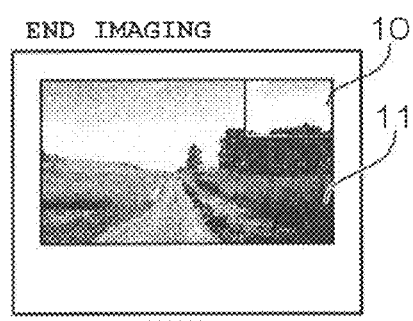

IMAGING DEVICE, IMAGING METHOD AND STORAGE MEDIUM FOR COMBINING IMAGES CONSECUTIVELY CAPTURED WHILE MOVING

CROSS-REFERENCE TO RELATED APPLICATION

This application is based upon and claims the benefit of priority from the prior Japanese Patent Application No. 2011-228561, filed Oct. 18, 2011, the entire contents of which is incorporated herein by reference.

BACKGROUND OF THE INVENTION

1. Field of the Invention

The present invention relates to an imaging device, an imaging method and a storage medium.

2. Description of the Related Art

In imaging devices such as digital cameras, a wide-angle lens is used to capture an image having a wide viewing angle. However, the viewing angle is limited. In addition, when a wide-angle lens having a short focal distance is used distortion occurs. Accordingly, there is a technology that generates an image having a wide viewing angle by combining images consecutively captured while the imaging device is being moved in up/down and left/right directions.

For example, Japanese Patent Application Laid-Open (Kokai) Publication No. 2003-163823 discloses a technology by which the user can decide an imaging area while capturing images by an imaging device that generates a wide-angle image by combining images consecutively captured while the imaging device is being moved in up/down and left/right directions.

SUMMARY OF THE INVENTION

In accordance with one aspect of the present invention, there is provided an imaging device comprising: a display section; a combining section which performs consecutive imaging while the imaging device is being moved in vertical and horizontal directions, and generates a wide range image by combining a plurality of images acquired by the consecutive imaging; an identifying section which identifies an imaging area from start of the imaging up to a current point, during the consecutive imaging by the combining section; a calculating section which calculates a final imaging area having a predetermined aspect ratio, based on the imaging area up to the current point which has been identified by the identifying section; and a display control section which displays, on the display section, imaging area information indicating the final imaging area having the predetermined aspect ratio which has been calculated by the calculating section, during the consecutive imaging by the combining section.

In accordance with another aspect of the present invention, there is provided an imaging method of an imaging device, comprising: a combining step of performing consecutive imaging while the imaging device is being moved in vertical and horizontal directions, and generating a wide range image by combining a plurality of images acquired by the consecutive imaging; an identifying step of identifying an imaging area from start of the imaging up to a current point, during the consecutive imaging in the combining step; a calculating step of calculating a final imaging area having a predetermined aspect ratio, based on the imaging area up to the current point which has been identified in the identifying step; and a display control step of displaying, on a display section, imaging area information indicating the final imaging area having the predetermined aspect ratio which has been calculated in the calculating step, during the consecutive imaging in the combining step.

In accordance with another aspect of the present invention, there is provided a non-transitory computer-readable storage medium having stored thereon a program that is executable by a computer in an imaging device, the program being executable by the computer to perform functions comprising: combining processing for performing consecutive imaging while the imaging device is being moved in vertical and horizontal directions, and generates a wide range image by combining a plurality of images acquired by the consecutive imaging; identification processing for identifying an imaging area from start of the imaging up to a current point, during the consecutive imaging by the combining processing; calculation processing for calculating a final imaging area having a predetermined aspect ratio, based on the imaging area up to the current point which has been identified by the identification processing; and display control processing for displaying, on a display section, imaging area information indicating the final imaging area having the predetermined aspect ratio which has been calculated by the calculation processing, during the consecutive imaging by the combining processing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2 is a flowchart for describing operations of the imaging device 1 according to the first embodiment;

FIG. 3 is also a flowchart for describing operations of the imaging device 1 according to the first embodiment;

FIG. 4 is also a flowchart for describing operations of the imaging device 1 according to the first embodiment;

FIG. 5A to FIG. 5G are schematic diagrams showing examples of display in a series of imaging operations by the imaging device 1 according to the first embodiment;

FIG. 8 is a flowchart for describing operations of an imaging device 1 according to a second embodiment of the present invention;

FIG. 12 is also a flowchart for describing operations of the imaging device 1 according to the third embodiment; and FIG. 13A to FIG. 13G are schematic diagrams showing examples of display in a series of imaging operations by the imaging device 1 according to the third embodiment.

DETAILED DESCRIPTION OF THE PREFERRED EMBODIMENTS

The present invention is an imaging device that generates an image with a wide viewing angle by combining images consecutively captured while the imaging device is being moved in up/down and left/right directions, in which a horizontal width is calculated when the photographer stops lateral movement, and a composite image created by images being captured and combined during imaging, a current live-view image, and a guide serving as a measure of a vertical width in relation to each aspect ratio are displayed. In addition, in the present invention, an aspect ratio desired by the photographer is determined from a movement distance at a timing at which movement is switched to vertical movement, unnecessary guide display is deleted, and guidance information for guiding the imaging device in a movement direction for efficiently capturing uncaptured areas is displayed.

The preferred embodiments of the present invention will hereinafter be described with reference to the drawings.

A. First Embodiment

A-1. Structure of the First Embodiment

Figure 1:
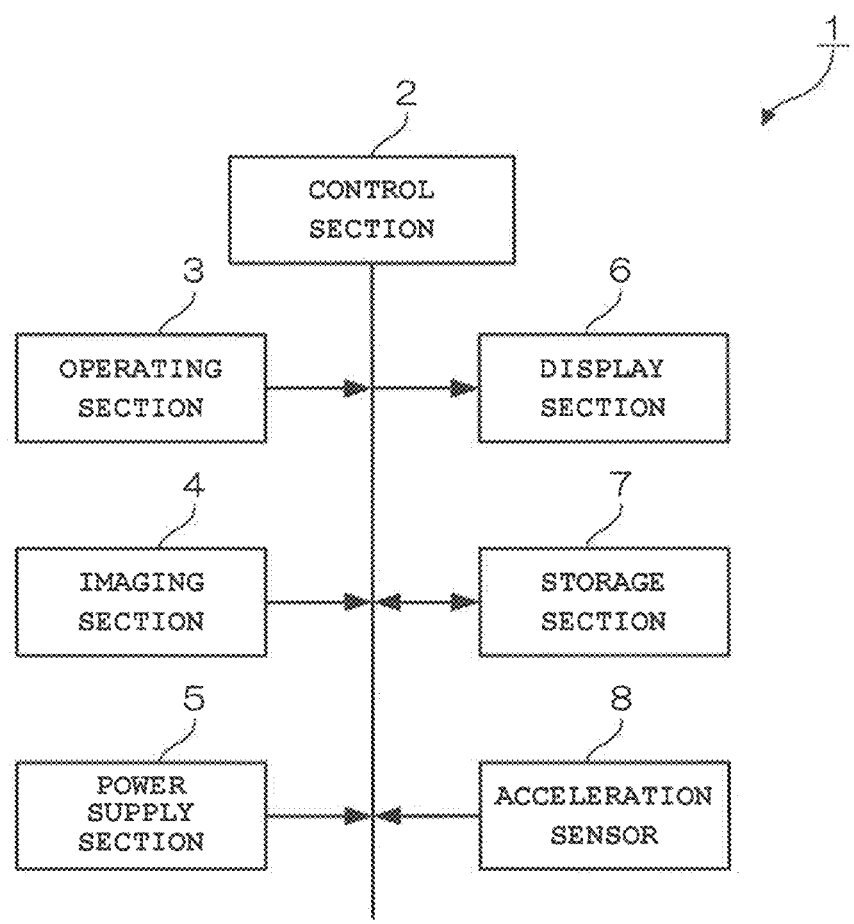
FIG. 1 is a block diagram showing the structure of an imaging device 1 according to a first embodiment of the present invention.

FIG. 1 is a block diagram showing the structure of an imaging device 1 according to a first embodiment of the present invention. The imaging device 1 in FIG. 1 includes a control section 2, an operating section 3, an imaging section 4, a power supply section 5, a display section 6, a storage section 7 and an acceleration sensor 8. The control section 2 is a single-chip microcomputer that controls each section of the imaging device 1. In particular, according to the first embodiment, the control section 2 acquires a movement direction, a movement amount and orientation (vertical orientation or horizontal orientation) of the imaging device 1 based on output from the acceleration sensor 8. Also, when the movement direction of the imaging device 1 in the beginning of imaging is substantially linear and a substantially horizontal or vertical direction, the control section 2 calculates a reference movement amount in the direction perpendicular to this substantially horizontal or vertical direction based on the acquired movement amount and orientation, by which a composite image having a predetermined aspect ratio (16:9, 4:3, etc.) can be captured. Moreover, the control section 2 controls the display section 6 to display imaging area information (guide) indicating an imaging area for acquiring a composite image having a predetermined aspect ratio, explanatory information (aspect ratio), direction guidance information (arrow) indicating an imaging direction and the like, based on the calculated reference movement amount. Furthermore, the control section 2 generates a composite image by combining captured images, and performs special image processing on the captured images when the movement direction of the imaging device 1 is a direction opposite to a normal direction.

The operating section 3 includes a plurality of operation keys, such as a shutter switch, a zoom switch, a mode key, a SET key and a cross-shaped key, and outputs operating signals to the control section 2 in response to key operations by a user. The imaging section 4, which includes a focus lens, a zoom lens, an image sensor and the like forms an image of a subject on the image sensor, and after converting the light of the captured subject into electrical signals, outputs the electrical signals. The power supply section 5 includes, for example, a secondary battery and supplies power to each section.

The display section 6 includes a color Liquid Crystal Display (LCD), an organic electroluminescent (EL) display, a backlight, and driver circuits thereof. When the imaging device 1 is in an imaging standby state, the display section 6 performs live-view display by which a subject captured by the imaging section 4 is displayed in real-time. During the playback of a recorded image, the display section 6 displays a recorded image that has been read-out from the storage section 7 and expanded.

The storage section 7 includes a memory that stores captured image data, a memory that stores programs required by the control section 2 to control each section of the imaging device 1 and data required for controlling each section and the like, and is constituted by a flash memory included in the imaging device 1, various memory cards detachably attached to the imaging device 1 and a card interface enabling input and output of data to and from the memory card. The acceleration sensor 8 is a three-axis acceleration sensor of a mechanical-type, an optical-type or a semiconductor-type which detects acceleration that is the time change rate of speed when the imaging device 1 is being moved. In the first embodiment, the control section 2 determines the movement distance and the movement direction of the imaging device 1 based on output from the acceleration sensor 8 during imaging. Note that, instead of the acceleration sensor 8, a gyro sensor may be used for detecting the movement distance and the movement direction of the imaging device 1. In addition, the movement distance and the movement direction may be detected by changes in output from the imaging section 4.

A-2. Operations of the First Embodiment

Next, operations of the above-described first embodiment will be described.

FIG. 2 to FIG. 4 are flowcharts for describing operations of the imaging device 1 according to the first embodiment. FIG. 5A to FIG. 5G are schematic diagrams showing examples of display in a series of imaging operations by the imaging device 1 according to the first embodiment. First, the control section 2 judges whether or not the imaging mode is a wide imaging mode (Step S10). When judged that the imaging mode is a wide imaging mode (YES at Step S10), the control section 2 performs live-view display to display an image captured by the imaging section 4 directly on the display section 6 (Step S12).

Then, before the imaging device 1 is moved, a portion of the final composite image is displayed on the display section 6 as a live-view image 10 (in this instance, the upper left corner: starting point), as shown in FIG. 5A. This portion is a starting point of wide imaging.

Next, the control section 2 judges whether or not the imaging device 1 has started moving, based on output from the acceleration sensor 8 (Step S14). When judged that the imaging device 1 has not started moving (NO at Step S14), the control section 2 waits by repeating Step S14. Conversely, when judged that the imaging device 1 has started moving (YES at Step S14), the control section 2 detects the movement direction based on the output from the acceleration sensor 8 (Step S16).

Next, the control section 2 judges whether or not the movement direction is substantially linear and is a substantially horizontal or vertical direction (Step S18). When judged that the movement direction is not substantially linear, or is not a substantially horizontal or vertical direction (NO at Step S18), the control section 2 performs error display indicating that wide imaging cannot be performed, and returns to Step S10.

Conversely, when judged that the movement direction is substantially linear and is a substantially horizontal or vertical direction (YES at Step S18), the control section 2 judges whether or not the movement direction is a normal direction (whether or not the movement is being made from left to right or top to bottom) (Step S20). When judged that the movement direction is a normal direction (YES at Step S20), the control section 2 performs combining processing for combining images captured up to this point, and displays the composite image on the display section 6 (Step S24).

Conversely, when judged that the movement direction is not a normal direction (NO at Step S20), the control section 2 performs special image processing when performing combining processing for combining the images captured up to this point (Step S22). The control section 2 then performs combining processing for combining the images on which the special image processing has been performed, and displays the composite image on the display section 6 (Step S24). That is, image processing on captured images can be easily performed by a movement direction being changed to a direction that is not a normal direction.

Next, the control section 2 detects the movement amount of the imaging device 1 based on the output from the acceleration sensor 8 (Step S26), and detects the orientation of the imaging device 1 (horizontal orientation or vertical orientation) (Step S28). Then, the control section 2 calculates a reference movement amount in the direction perpendicular to the substantially horizontal or vertical direction based on the movement amount, orientation and settings (Step S30). Next, the control section 2 displays imaging area information (guide) indicating an imaging area for acquiring a composite image having a predetermined aspect ratio and explanatory information (aspect ratio) on the display section 6, based on the reference movement amount (Step S32). An aspect ratio "16:9" or "4:3" of the image currently being captured, high definition "HD", standard definition "SD" and the like are displayed as this explanatory information.

On the display section 6 immediately after the start of the movement, a composite image 11 created by images captured in the movement direction (images captured while movement from left to right indicated by the arrow is being made) being sequentially combined with the image serving as the starting point, and the live-view image 10 that is the currently captured image are displayed, as shown in FIG. 5B. FIG. 5C shows a display state where the imaging device 1 has reached the furthest position in the horizontal direction, in which the composite image 11 is displayed in the area of the horizontal direction over which the imaging device 1 has been moved, and the current live-view image 10 is displayed on the right end. Also, guides 12a and 12b that are imaging area information indicating an imaging area, and aspect ratios "16:9" and "4:3" that are explanatory information are displayed on the display section 6, in addition to the current composite image 11 and the live-view image 10, as shown in FIG. 5B and FIG. 5C (the guide 12a indicates an aspect ratio of 16:9, and the guide 12b indicates an aspect ratio of aspect ratio 4:3).

Next, the control section 2 judges whether or not the movement direction of the imaging device 1 has been changed, based on output from the acceleration sensor 8 (Step S34). When judged that the movement direction has not been changed (NO at Step S34), since the imaging device 1 is still being moved in the same direction, the control section 2 returns to Step S24 and repeats the above-described processing. Conversely, when judged that the movement direction of the imaging device 1 has been changed (YES at Step S34), the control section 2 judges whether or not the movement direction has been changed to a substantially perpendicular direction (Step S36 in FIG. 3).

When judged that the movement direction has not been changed to a substantially perpendicular direction (NO at Step S36), the control section 2 displays an error message stating that wide imaging cannot be performed, and returns to Step S10 in FIG. 2 to repeat the above-described processing. Conversely, when judged that the movement direction has been changed to a substantially perpendicular direction (YES at Step S36), the control section 2 performs combining processing for combining the captured image with the current composite image, and displays the composite image on the display section 6 (Step S38).

FIG. 5D shows a display state immediately after the movement of the imaging device 1 in the substantially perpendicular direction is started. The user moves the imaging device 1 from left to right in the horizontal direction with the upper left end as a starting point, in accordance with the guides 12a and 12b indicating the imaging area, and then moves it in the substantially perpendicular direction (downward) when the right end is reached. At this stage, the current composite image 11, the live-view image 10 immediately after starting to move in the substantially perpendicular direction, the guides 12a and 12b indicating the imaging area and the respective aspect ratios "16:9" and "4:3" of the guides 12a and 12b are displayed on the display section 6, as shown in FIG. 5D.

Next, the control section 2 judges whether or not the movement direction has been changed (whether or not the imaging device 1 is being moved in a substantially horizontal direction) (Step S40). When judged that the movement direction has not been changed (NO at Step S40), since the imaging device 1 has not yet been moved in a substantially horizontal direction, the control section 2 enters a waiting state. Conversely, when judged that the movement direction has been changed (YES at Step S40), the control section 2 judges whether or not the movement direction is the opposite direction (substantially horizontal direction from right to left) of the initial movement (substantially horizontal movement from left to right) direction (Step S42). When judged that the movement direction is not the opposite direction of the initial movement direction (NO at Step S42), the control section 2 displays an error message stating that wide imaging cannot be performed, and returns to Step S10 in FIG. 2 to repeat the above-described processing.

Conversely, when judged that the movement direction is the opposite direction of the initial movement direction (YES at Step S42), the aspect ratio (vertical and horizontal lengths) of the final composite image is determined. Therefore, the control section 2 deletes the display of unnecessary imaging area information (guide 12a or 12b) and displays direction guidance information (arrow) indicating the imaging direction on the display section 6 (Step S44). Note that the display of the direction guidance information is performed using existing technology. Next, the control section 2 performs combining processing for combining the captured image with the current composite image, and displays the composite image on the display section 6 (Step S46). Then, the control section 2 judges whether or not the area within the guide has been completely captured (Step S48). As a method for judging whether or not the area within the guide has been completely captured, a method may be used in which management in pixel units is performed. Alternatively, a method may be used in which areas that have not been combined with the current composite image are displayed in a predetermined color, such as black, and whether or not areas in the predetermined color are present is judged. Then, when judged that the area within the guide has not been completely captured (NO at Step S48), the control section 2 returns to Step S46. Hereafter, until the area is completely captured, the control section 2 repeatedly performs the combining processing and the display of the composite image.

FIG. 5E shows a display example immediately after the imaging device 1 is stopped at the furthest position in the vertical direction and its movement in the opposite horizontal direction is started. At this stage, the aspect ratio desired by the user has been determined. Therefore, the guide 12a or 12b has been deleted, and direction guidance information (arrow) 14 indicating the movement direction of the imaging device 1 has been displayed. FIG. 5F shows a display example immediately after the imaging device 1 is moved upward at the left end. At this stage, it is clear that the imaging will be completed when the imaging device 1 is moved to the uncaptured area 15.

Next, when judged that the area within the guide has been completely captured (YES at Step S48), the control section 2 ends the imaging (Step S50), and after recording the captured image in the storage section 7 (Step S52), returns to Step S10 in FIG. 2 to repeat the above-described processing.

FIG. 5G shows a display example immediately after the imaging is completed, in which the live-view image 10 has reached the middle of the imaging area, and the imaging area has been completely captured.

At Step S10, when judged that the imaging mode is not a wide imaging mode (NO at Step S10), the control section 2 judges whether or not the imaging mode is a normal imaging mode (Step S54 in FIG. 4). Note that the normal imaging herein refers to a single image being captured by a single shutter depression operation. When judged that the imaging mode is the normal imaging mode (YES at Step S54), the control section 2 performs image capturing processing (Step S56), and after recording the captured image in the storage section 7 (Step S58), returns to Step S10 in FIG. 2 to repeat the above-described processing.

Conversely, when judged that the imaging mode is not the normal imaging mode (NO at Step S54), the control section 2 judges whether or not an aspect setting operation has been performed (Step S60). When judged that an aspect setting operation has been performed (YES at Step S60), the control section 2 judges whether or not user setting has been performed (Step S62). When judged that user setting has been performed (YES at Step S62), the control section 2 sets an aspect ratio (16:9, 4:3, or the like) set by the user (Step S64), and returns to Step S10 in FIG. 2 to repeat the above-described processing. Conversely, when judged that user setting has not been performed (NO at Step S62), the control section 2 performs automatic setting by which an aspect ratio is set by the movement of the imaging device 1 (Step S66), and returns to Step S10 in FIG. 2 to repeat the above-described processing.

At Step S60, when judged that an aspect setting operation has not been performed (NO at Step S60), the control section 2 judges whether or not another operation, such as a playback operation or an imaging setting operation, has been performed (Step S68). When judged that another operation has been performed (NO at Step S68), the control section 2 performs processing based on this operation (Step S70), and returns to Step S10 in FIG. 2 to repeat the above-described processing. Conversely, when judged that another operation has not been performed (NO at Step S68), the control section 2 returns to Step S10 in FIG. 2 without performing any processing, and then repeats the above-described processing.

Figure 6A:
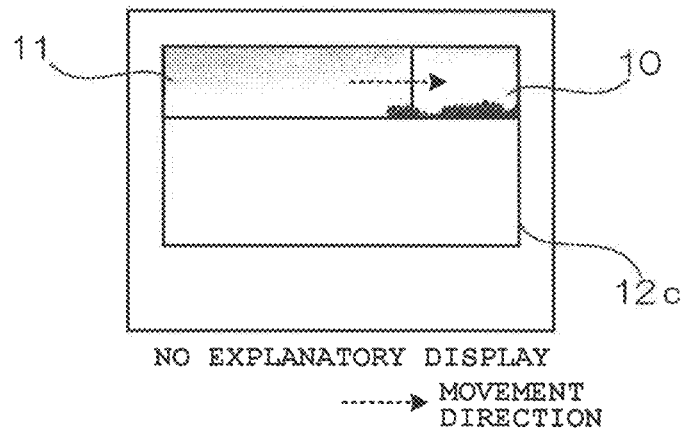
FIG. 6A to FIG. 6C are schematic diagrams showing examples of display during imaging by the imaging device 1 according to the first embodiment.
Figure 6B:
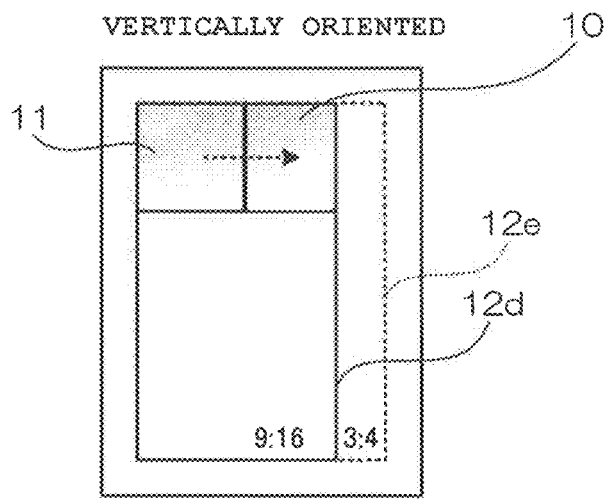
Figure 6C:
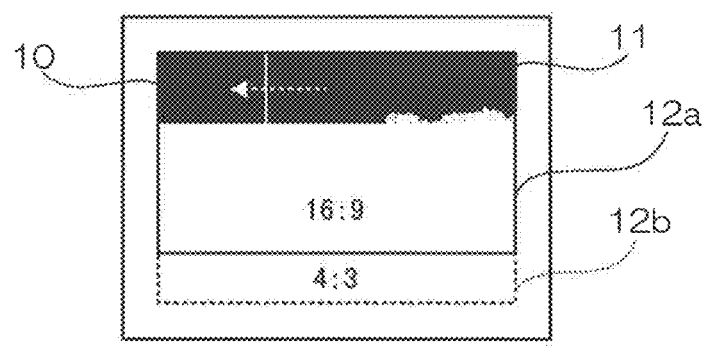

FIG. 6A to FIG. 6C are schematic diagrams showing examples of display during imaging by the imaging device 1 according to the first embodiment. FIG. 6A shows a display example when a fixed aspect ratio has been set by user setting at Step S64 in FIG. 4 described above. In this instance, since the aspect ratio has been fixed, a guide 12c indicating the fixed aspect ratio set by user setting is displayed in addition to the live-view image 10 and the composite image 11. Also, since the aspect ratio is set by user setting, explanatory display therefor is not performed.

FIG. 6B shows a display example when imaging is performed with the imaging device 1 being held in the vertical orientation. In FIG. 5A to FIG. 5G, an instance has been described in which the orientation of the imaging device 1 detected at Step S28 in FIG. 2 is the horizontal orientation, or in other words, imaging is performed with the imaging device 1 being held in the horizontal orientation (laterally long direction). In contrast, in the example of FIG. 6B, the orientation of the imaging device 1 detected at Step S28 is the vertical orientation, or in other words, imaging is performed with the imaging device 1 being held in the vertical orientation. In this instance, the calculation of the reference movement amount at Step S30 is performed based on the vertical orientation. Therefore, an aspect ratio that forms a vertically long area is set as shown in FIG. 6B. Accordingly, vertically long guides 12d and 12e, and aspect ratios "9:16" and "3:4" are displayed in addition to the live-view image 10 and the composite image 11.

As described above, when the orientation of the imaging device 1 is detected and if the imaging device 1 is detected to be horizontally oriented, the reference movement amount is calculated based on an aspect ratio that forms a horizontally long area. On the other hand, when the imaging device 1 is detected to be vertically oriented, the reference movement amount is calculated based on an aspect ratio that forms a vertically long area. Therefore, an aspect ratio that forms a horizontally long area or an aspect ratio that forms a vertically long area can be automatically selected based on how the imaging device 1 is held.

FIG. 6C shows a display example when the imaging device is moved in a direction opposite to a normal direction (left to right or top to bottom), and images are combined while image processing (monochrome, soft, etc) differing from normal image processing is performed. As described above, when it is judged at Step S20 in FIG. 2 that the movement direction is not a normal direction, the control section 2 performs special image processing (monochrome inverse processing in the example in FIG. 6C) at Step S22, and displays the composite image 11 on which the special image processing has been performed, the live-view image 10, the guides 12a and 12b, and the aspect ratios "16:9" and "4:3" at Step S24.

Figure 7A:
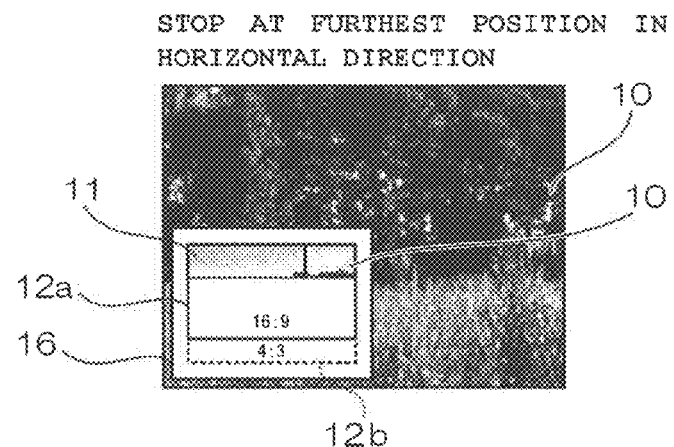
FIG. 7A to FIG. 7C are schematic diagrams showing other examples of display during imaging by the imaging device 1 according to the first embodiment.
Figure 7B:
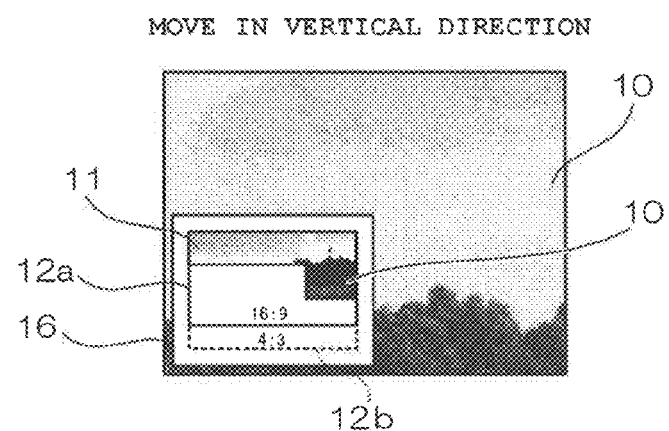
Figure 7C:
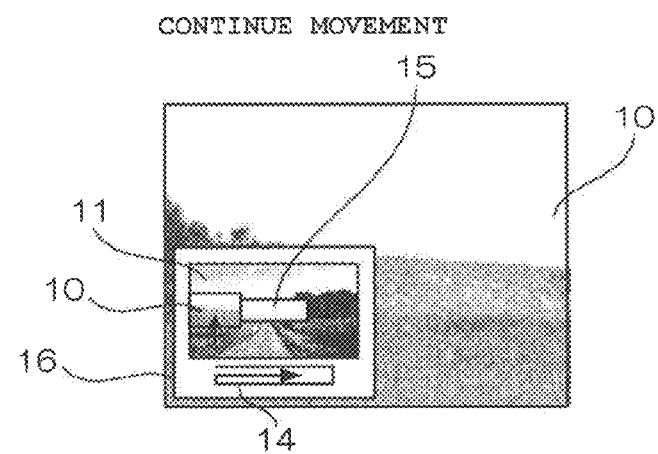

FIG. 7A to FIG. 7C are schematic diagrams showing other examples of display during imaging by the imaging device 1 according to the first embodiment. FIG. 7A to FIG. 7C show examples in which the live-view image 10 is displayed in full-screen on the display section 6, and the composite image 11, the live-view image 10, the guides 12a and 12b, and the aspect ratios "16:9" and "4:3" are displayed in a small window 16 displayed overlapping with the full-screen live-view image 10.

FIG. 7A shows a display state when the imaging device 1 has reached the furthest position in the horizontal direction as in the case of FIG. 5C, in which the current live-view image 10 is displayed on the entire display section 6, and the small window 16 displaying the composite image 11, the live-view image 10, the guides 12a and 12b, and the aspect ratios "16:9" and "4:3" is displayed overlapping with the full-screen live-view image 10.

FIG. 7B shows a display state when the imaging device 1 has moved in a substantially perpendicular direction (downward) in relation to the initial horizontal direction as in the case of FIG. 5D, in which the current live-view image 10 is displayed on the entire display section 6, and the small window 16 displaying the composite image 11, the live-view image 10, the guides 12a and 12b, and the aspect ratios "16:9" and "4:3" is displayed overlapping with the full-screen live-view image 10 as in the case of in FIG. 7A.

FIG. 7C shows a display example immediately after the imaging device 1 is moved upward at the left end, as in the case of FIG. 5F. At this stage, the composite image 11, the live-view image 10, the uncaptured area 15, and the direction guidance information (arrow) 14 indicating the movement direction of the imaging device 1 are displayed in the small window 16.

(First Variation Example)

Note that the guide display at Step S32 in FIG. 2 of above-described first embodiment may be performed when the movement of the imaging display 1 is stopped. In this configuration, the guide display is performed when the initial movement of the imaging device 1 is stopped. Therefore, the guide display is not displayed at all times, and whereby confusion can be avoided.

(Second Variation Example)

In addition, the guide display at Step S32 in FIG. 2 of above-described first embodiment may be performed when the movement of the imaging device 1 is stopped and restarted in a substantially perpendicular direction. In this configuration, the guide display is performed when the initial movement of the imaging device 1 started at the beginning of imaging is stopped and restarted in the substantially perpendicular direction. Therefore, the guide display can be displayed only when it is required.

According to the above-described first embodiment, the final imaging area having a predetermined aspect ratio is calculated based on an imaging area from the start of the imaging up to the current point, and imaging area information (guide) indicating the final imaging area having the predetermined aspect ratio is displayed on the display section 6. Therefore, a composite imaging with a wide viewing angle can be captured with a predetermined aspect ratio, simply by imaging being performed while the imaging device 1 is moved in accordance with guide display indicating the imaging area. As a result, images having a uniform aspect ratio can be easily generated.

In addition, in the first embodiment, an imaging area from the start of imaging up to the current point is calculated based on the movement direction and the movement amount of the imaging device 1. Therefore, the user can acquire an imaging area from the start of imaging up to the current point by simply moving the imaging device 1 as usual.

Moreover, in the above-described first embodiment, when the movement direction of the imaging device 1 in its initial movement started at the beginning of imaging is substantially linear and a substantially horizontal or vertical direction, a reference movement amount in the direction perpendicular to the substantially horizontal or vertical direction, which is used to identify the final imaging area having a predetermined aspect ratio, is calculated based on the movement amount. Therefore, the final imaging area having a predetermined aspect ratio can be identified simply by the user moving the imaging device 1 as usual.

B. Second Embodiment

Next, a second embodiment of the present invention will be described.

B-1. Structure of the Second Embodiment

In the above-described first embodiment, the guides 12a and 12b, or 12c are displayed having an aspect ratio that forms a horizontally long area, on the assumption that the initial movement direction in the beginning of imaging is substantially linear and a substantially horizontal direction. However, in the second embodiment, when the movement direction of the initial movement in the beginning of imaging is substantially linear and a substantially horizontal direction, the reference movement amount is calculated based on an aspect ratio that forms a horizontally long area, and when it is substantially linear and a substantially vertical direction, the reference movement amount is calculated based on an aspect ratio that forms a vertically long area. As a result, an aspect ratio that forms a horizontally long area or an aspect ratio that forms a vertically long area can be selected, without the user changing the way he or she holds the imaging device 1. Note that the structure of the imaging device 1 in the second embodiment is the same as that in FIG. 1, and therefore explanation thereof is omitted.

B-2. Operations of the Second Embodiment

Next, operations of the second embodiment will be described.

Figure 9:
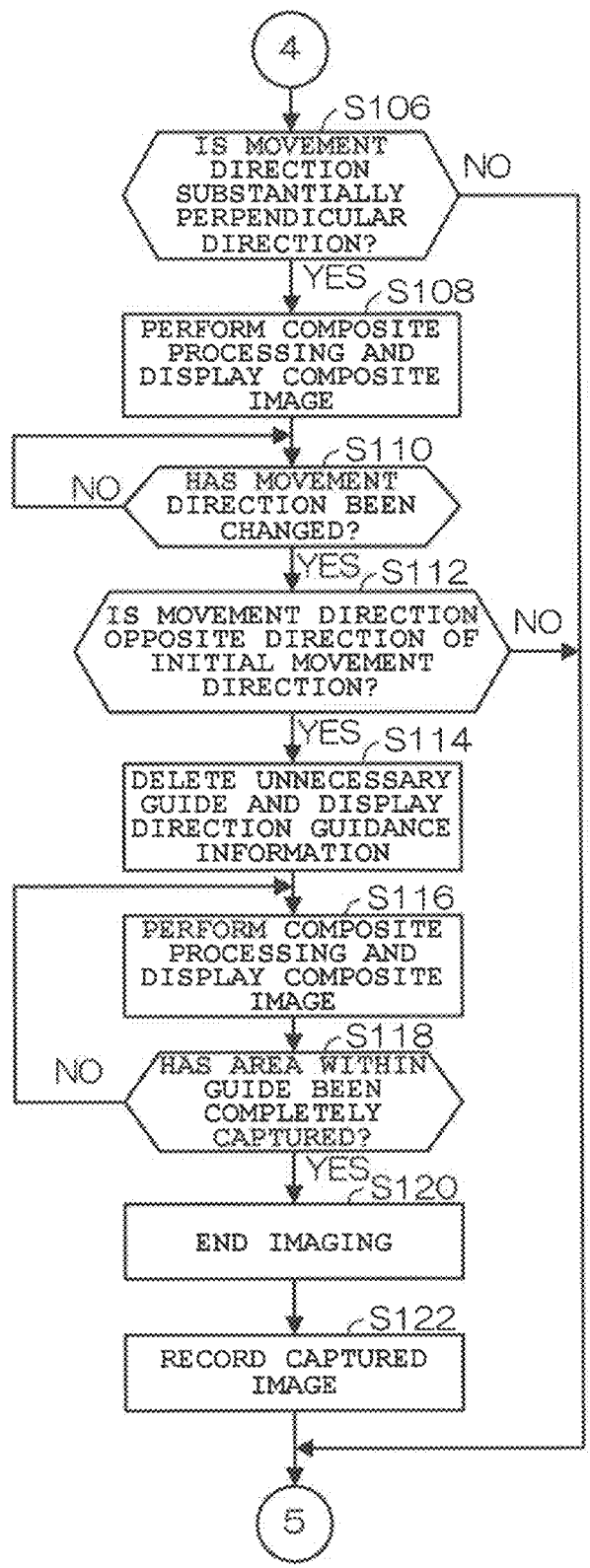
FIG. 9 is also a flowchart for describing operations of the imaging device 1 according to the second embodiment.

FIG. 8 and FIG. 9 are flowcharts for describing operations of the imaging device 1 according to the second embodiment. First, the control section 2 judges whether or not the imaging mode is a wide imaging mode (Step S80). When judged that the imaging mode is a wide imaging mode (YES at Step S80), the control section 2 performs live-view display to display an image captured by the imaging section 4 directly on the display section 6 (Step S82).

Next, the control section 2 judges whether or not the imaging device 1 has started moving, based on output from the acceleration sensor 8 (Step S84). When judged that the imaging device 1 has not started moving (NO at Step S84), the control section 2 waits by repeating Step S84. Conversely, when judged that the imaging device 1 has started moving (YES at Step S84), the control section 2 detects the movement direction based on the output from the acceleration sensor 8 (Step S86).

Next, the control section 2 judges whether or not the movement direction is substantially linear and is a substantially horizontal or vertical direction (Step S88). When judged that the movement direction is not substantially linear, or is not a substantially horizontal or vertical direction (NO at Step S88), the control section 2 performs error display indicating that wide imaging cannot be performed, and returns to Step S80.

Conversely, when judged that the movement direction is substantially linear and is a substantially horizontal or vertical direction (YES at Step S88), the control section 2 judges whether the movement direction is the horizontal direction or the vertical direction (Step S90), and then judges whether or not the direction is a normal direction (whether or not the movement is being made from left to right or top to bottom) (Step S92). When judged that the direction is a normal direction (YES at Step S92), the control section 2 performs combining processing for combining images captured up to this point, and displays the composite image on the display section 6 (Step S96).

Conversely, when judged that the movement direction is not a normal direction (the movement is not being made from left to right or top to bottom) (NO at Step S92), the control section 2 performs special image processing when performing combining processing for combining the images captured up to this point (Step S94). The control section 2 then performs combining processing for combining the images on which the special image processing has been performed, and displays the composite image on the display section 6 (Step S96). That is, image processing on captured images can be easily performed by a movement direction being changed to a direction that is not a normal direction.

Next, the control section 2 detects the movement amount of the imaging device 1 based on the output from the acceleration sensor 8 (Step S98) and calculates a reference movement amount based on the movement amount, whether the movement direction is horizontal or vertical, and settings (Step S100). Next, the control section 2 displays imaging area information (guide) indicating an imaging area for acquiring a composite image having a predetermined aspect ratio and explanatory information (aspect ratio) on the display section 6, based on the reference movement amount (Step S102). An aspect ratio "16:9" or "4:3" of the image currently being captured, high definition "HD", standard definition "SD", and the like are displayed as this explanatory information.

Next, the control section 2 judges whether or not the movement direction of the imaging device 1 has been changed, based on output from the acceleration sensor 8 (Step S104). When judged that the movement direction has not been changed (NO at Step S104), since the imaging device 1 is still moving in the same direction, the control section 2 returns to Step S96 and repeats the above-described processing. Conversely, when judged that the movement direction of the imaging device 1 has been changed (YES at Step S104), the control section 2 judges whether or not the movement direction has been changed to a substantially perpendicular direction (Step S106 in FIG. 9).

When judged that the movement direction has not been changed to a substantially perpendicular direction (NO at Step S106), the control section 2 displays an error message stating that wide imaging cannot be performed, and returns to Step S80 in FIG. 8 to repeat the above-described processing. Conversely, when judged that the movement direction has been changed to a substantially perpendicular direction (YES at Step S106), the control section 2 performs the combining processing for combining the captured image with the current composite image, and displays the composite image on the display section 6 (Step S108).

Next, the control section 2 judges whether or not the movement direction has been changed (Step S110). When judged that the movement direction has not been changed (NO at Step S110), the control section 2 waits at Step S110. Conversely, when judged that the movement direction has been changed (YES at Step S110), the control section 2 judges whether or not the movement direction is the opposite direction of the initial movement direction (Step S112). When judged that the movement direction is not the opposite direction of the initial movement direction (NO at Step S112), the control section 2 displays an error message stating that wide imaging cannot be performed, and returns to Step S80 in FIG. 8 to repeat the above-described processing.

Conversely, when judged that the movement direction is the opposite direction of the initial movement direction (YES at Step S112), the aspect ratio (vertical and horizontal lengths) of the final composite image is determined. Therefore, the control section 2 deletes the display of unnecessary imaging area information (guide 12a or 12b) and displays direction guidance information (arrow) indicating the imaging direction on the display section 6 (Step S114). Note that the display of the direction guidance information is performed using existing technology. Next, the control section 2 performs combining processing for combining the captured images with the current composite image, and displays the composite image on the display section 6 (Step S116). Then, the control section 2 judges whether or not the area within the guide has been completely captured (Step S118). When judged that the area within the guide has not been completely captured (NO at Step S118), the control section 2 returns to Step S116. Hereafter, until the area is completely captured, the control section 2 repeatedly performs the combining processing and the display of the composite image.

When judged that the area within the guide has been completely captured (YES at Step S118), the control section 2 ends the imaging (Step S120), and after recording the captured image in the storage section 7 (Step S122), returns to Step S80 in FIG. 8 to repeat the above-described processing.

At Step S80, when judged that the imaging mode is not a wide imaging mode (NO at Step S80), the control section 2 controls operations in accordance with the flowchart shown in FIG. 4, as in the case of the first embodiment.

Figure 10:
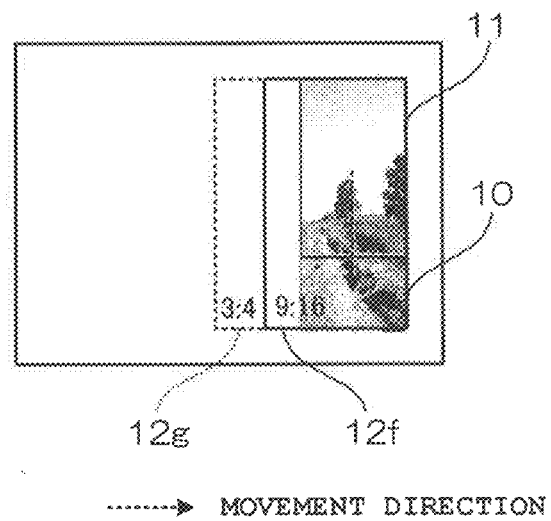
FIG. 10 is a schematic diagram showing an example of display during imaging by the imaging device 1 according to the second embodiment.

FIG. 10 is a schematic diagram showing a display example during imaging by the imaging device 1 according to the second embodiment, in which the imaging device 1 has been substantially linearly moved from top to bottom in the substantially vertical direction immediately after the start of imaging. In this instance, the control section 2 detects movement in the "vertical" direction at Step S90 in FIG. 8, and calculates the reference movement amount based on the movement amount and the movement in the "vertical" direction. Therefore, guides 12g and 12f are displayed having an aspect ratio that forms a vertically long area. Subsequently, the movement direction of the imaging device 1 is changed, so that the imaging device 1 is moved from right to left. Then, the imaging device 1 is substantially linearly moved from bottom to top in the vertical direction. As a result of this configuration, in the second embodiment, an aspect ratio that forms a horizontally long area or an aspect ratio that forms a vertically long area can be selected based on the initial movement direction of the imaging device 1.

According to the above-described second embodiment, the final imaging area having a predetermined aspect ratio is calculated based on an imaging area from the start of the imaging up to the current point, and imaging area information (guide) indicating the final imaging area having the predetermined aspect ratio is displayed on the display section 6. Therefore, a composite imaging with a wide viewing angle can be captured with a predetermined aspect ratio, simply by imaging being performed while the imaging device 1 is moved in accordance with guide display indicating the imaging area. As a result, images having a uniform aspect ratio can be easily generated.

In addition, in the second embodiment, an imaging area from the start of imaging up to the current point is calculated based on the movement direction and the movement amount of the imaging device 1. Therefore, the user can acquire an imaging area from the start of imaging up to the current point by simply moving the imaging device 1 as usual.

Moreover, in the above-described second embodiment, when the movement direction of the imaging device 1 in its initial movement started at the beginning of imaging is substantially linear and a substantially horizontal or vertical direction, a reference movement amount in the direction perpendicular to the substantially horizontal or vertical direction, which is used to identify the final imaging area having a predetermined aspect ratio, is calculated based on the movement amount. Therefore, the final imaging area having a predetermined aspect ratio can be identified simply by the user moving the imaging device 1 as usual.

Furthermore, in the above-described second embodiment, when the movement direction of the imaging device 1 in its initial movement started at the beginning of imaging is substantially linear and a substantially horizontal direction, the reference movement amount is calculated based on an aspect ratio that forms a horizontally long area, and when it is substantially linear and a substantially vertical direction, the reference movement amount is calculated based on an aspect ratio that forms a vertically long area. As a result, an aspect ratio that forms a horizontally long area or an aspect ratio that forms a vertically long area can be selected simply by the user changing the movement direction of the imaging device 1 from the starting point, without the user changing the way he or she holds the imaging device 1.

C. Third Embodiment

Next, a third embodiment of the present invention will be described.

C-1. Structure of the Third Embodiment

In the third embodiment, a position to be the center of a composite image is specified at the start of the imaging, and the reference movement amount is calculated based on a movement amount from the specified position. As a result of this configuration, a subject to be placed in the center of a composite image can be specified at the beginning, and whereby the composition of the composite image can be easily decided. Note that the structure of the imaging device 1 in the third embodiment is the same as that in FIG. 1, and therefore explanation thereof is omitted.

C-2. Operations of the Third Embodiment

Next, operations of the third embodiment will be described.

Figure 11:
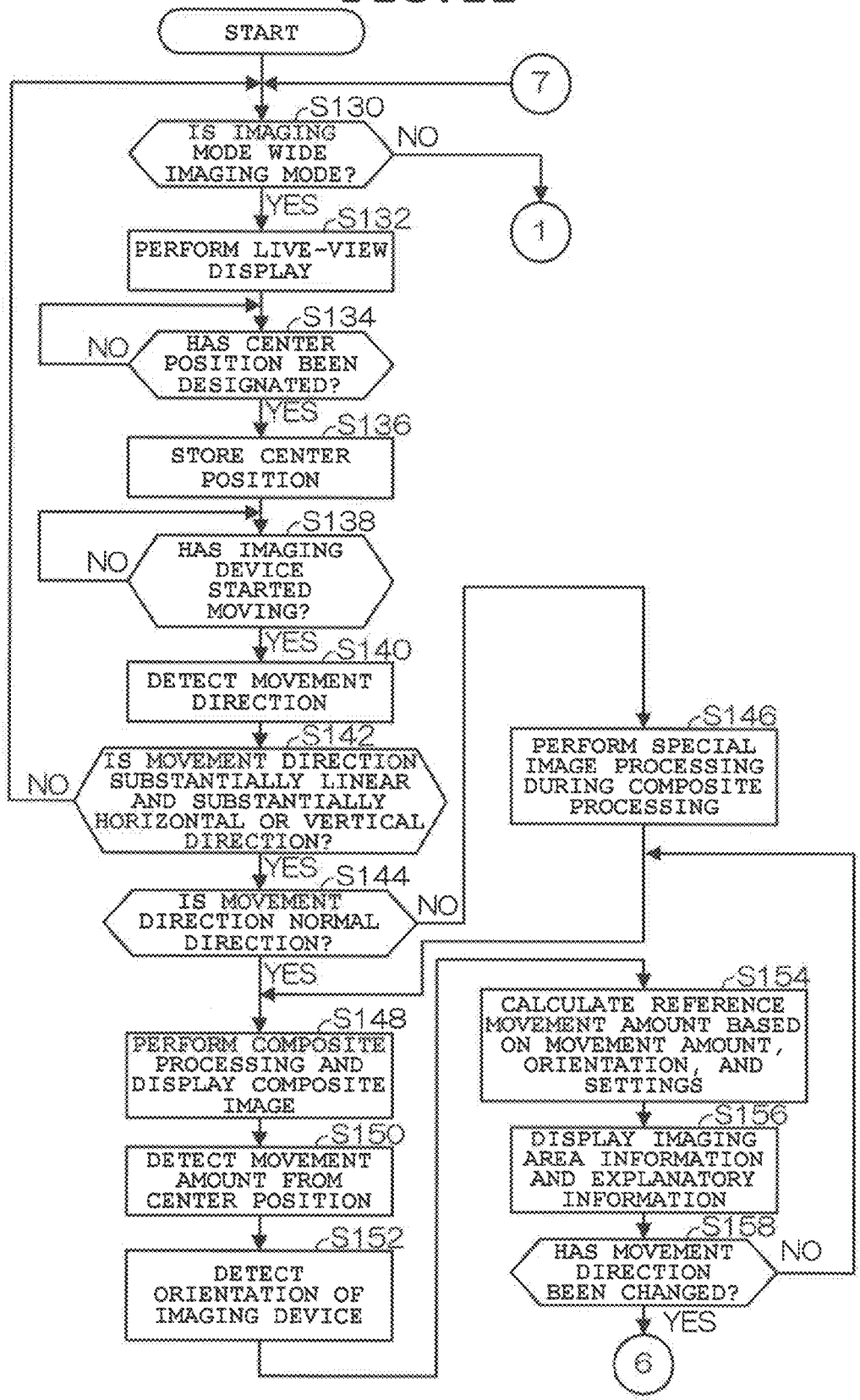
FIG. 11 is a flowchart for describing operations of an imaging device 1 according to a third embodiment of the present invention.

FIG. 11 and FIG. 12 are flowcharts for describing operations of the imaging device 1 according to the third embodiment, and FIG. 13A to FIG. 13G are schematic diagrams showing examples of display in a series of imaging operations by the imaging device 1 according to the third embodiment. First, the control section 2 judges whether or not the imaging mode is a wide imaging mode (Step S130). When judged that the imaging mode is a wide imaging mode (YES at Step S130), the control section 2 performs live-view display to display an image captured by the imaging section 4 directly on the display section 6 (Step S132).

Next, the control section 2 judges whether or not the center position of the final composite image has been specified (Step S134). Note that whether or not the center position has been specified may be judged based on a predetermined operation, such as the shutter switch being pressed for a long time. When judged that the center position has not been specified (NO at Step S134), the control section 2 enters a waiting state by repeating Step S134. When judged that the user has specified a subject to be placed in the center of the composite image (YES at Step S134), the control section 2 stores the specified center position (Step S136).

As shown in FIG. 13A, before the imaging device 1 is moved, a portion of the final composite image (in this instance, the center: starting point) is displayed on the display section 6 as the live-view image 10. Then, when the user designates this position as the center position of the final composite image, the image of this position is displayed in the center of the display section 6 as the live-view image 10, as shown in FIG. 13B.

Next, the control section 2 judges whether or not the imaging device 1 has started moving, based on output from the acceleration sensor 8 (Step S138). When judged that the imaging device 1 has not started moving (NO at Step S138), the control section 2 waits by repeating Step S138. Conversely, when judged that the imaging device 1 has started moving (YES at Step S138), the control section 2 detects the movement direction based on the output from the acceleration sensor 8 (Step S140).

Next, the control section 2 judges whether or not the movement direction is substantially linear and is a substantially horizontal or vertical direction (Step S142). When judged that the movement direction is not substantially linear, or is not a substantially horizontal or vertical direction (NO at Step S142), the control section 2 performs error display indicating that wide imaging cannot be performed, and returns to Step S130.

Conversely, when judged that the movement direction is substantially linear and is a substantially horizontal or vertical direction (YES at Step S142), the control section 2 judges whether or not the movement direction is a normal direction (whether or not the movement is being made from left to right or top to bottom) (Step 144). When judged that the movement direction is a normal direction (YES at Step S144), the control section 2 performs combining processing for combining images captured up to this point, and displays the composite image on the display section 6 (Step S148).

Conversely, when judged that the movement direction is not a normal direction (NO at Step S144), the control section 2 performs special image processing when performing combining processing for combining the images captured up to this point (Step S146). The control section 2 then performs combining processing for combining the images on which the special image processing has been performed, and displays the composite image on the display section 6 (Step S148). That is, image processing on captured images can be easily performed by a movement direction being changed to a direction that is not a normal direction.

Next, the control section 2 detects the movement amount of the imaging device 1 from the center position, based on the output from the acceleration sensor 8 (Step S150), and detects the orientation of the imaging device 1 (horizontal orientation or vertical orientation) (Step S152). Then, the control section 2 calculates the reference movement amount based on the movement amount, orientation and settings (Step S154). Note that switching between an aspect ratio that forms a horizontally long area and an aspect ratio that forms a vertically long area based on whether the initial movement direction is substantially horizontal or substantially vertical may be performed as in the case of the second embodiment. Next, the control section 2 displays imaging area information (guide) indicating an imaging area for acquiring a composite image having a predetermined aspect ratio and explanatory information (aspect ratio) on the display section 6, based on the reference movement amount (Step S156). An aspect ratio "16:9" or "4:3" of the image currently being captured, high definition "HD", standard definition "SD" and the like are displayed as this explanatory information.

Next, the control section 2 judges whether or not the movement direction of the imaging device 1 has been changed, based on output from the acceleration sensor 8 (Step S158). When judged that the movement direction has not been changed (NO at Step S158), since the imaging device 1 is still being moved in the same direction, the control section 2 returns to Step S148 and repeats the above-described processing.

On the display section 6 immediately after the start of the movement, the composite image 11 created by images captured in the movement direction (images captured while movement from the center to the right indicated by the arrow is being made) being sequentially combined with the image serving as the starting point, and the live-view image 10 that is the current captured image are displayed, as shown in FIG.

13C. FIG. 13C shows a display state where the imaging device 1 has reached the furthest position in the horizontal direction, in which guides 12h and 12i that are imaging area information indicating an imaging area, and aspect ratios "16:9" and "4:3" that are explanatory information are displayed on the display section 6, in addition to the current composite image 11 and the live-view image 10 (the guide 12h indicates an aspect ratio of 16:9, and the guide 12i indicates an aspect ratio of 4:3).

Note that, when imaging is performed with the imaging device 1 being held in the horizontal orientation (laterally long direction), the calculation of the reference movement amount at Step S154 is performed based on the horizontal orientation, and an aspect ratio that forms a horizontally long area is set thereby, as in the case of the first embodiment. In addition, when imaging is performed with the imaging device being held in the vertical orientation (vertically long direction), the calculation of the reference movement amount at Step S154 is performed based on the vertical orientation, and an aspect ratio that forms a vertically long area is set thereby.

At Step S158, when judged that the movement direction of the imaging device 1 has been changed (YES at Step S158), the control section 2 judges whether or not the movement direction has been changed to a substantially perpendicular direction (Step S160 in FIG. 12). When judged that the movement direction has not been changed to a substantially perpendicular direction (NO at Step S160), the control section 2 displays an error message stating that wide imaging cannot be performed, and returns to Step S130 in FIG. 11 to repeat the above-described processing. Conversely, when judged that the movement direction has been changed to a substantially perpendicular direction (YES at Step S160), the control section 2 performs combining processing for combining the captured image with the current composite image, and displays the composite image on the display section 6 (Step S162).

FIG. 13D shows a display state when the imaging device 1 has been moved in the substantially perpendicular direction. The user moves the imaging device 1 from the center to the right in the horizontal direction with the center as a starting point, in accordance with the guides 12h and 12i indicating the imaging area, and then moves it in the substantially perpendicular direction (downward) when the right end is reached. At this stage, the current composite image 11, the live-view image 10 moved in the substantially perpendicular direction, the guides 12i and 12h indicating the imaging area, and the respective aspect ratios "16:9" and "4:3" of the guides 12i and 12h are displayed on the display section 6, as shown in FIG. 13D. In this instance, guides indicating the whole imaging area including the side opposite to the side to which the imaging device 1 has moved are displayed as the guides 12i and 12h.

Next, the control section 2 judges whether or not the movement direction has been changed (whether or not the imaging device 1 is being moved in a substantially horizontal direction) (Step S164). When judged that the movement direction has not been changed (NO at Step S164), since the imaging device 1 has not yet been moved in a substantially horizontal direction, the control section 2 enters a waiting state. Conversely, when judged that the movement direction has been changed (YES at Step S164), since the imaging device 1 is being moved in a substantially horizontal direction, the control section 2 judges whether or not the movement direction is the opposite direction (substantially horizontal direction from right to left) of the initial movement (substantially horizontal movement from left to right) direction (Step S166).

When judged that the movement direction is not the opposite direction of the initial movement direction (NO at Step S166), the control section 2 displays an error message stating that wide imaging cannot be performed, and returns to Step S130 in FIG. 11 to repeat the above-described processing.

Conversely, when judged that the movement direction is the opposite direction of the initial movement direction (YES at Step S166), the aspect ratio (vertical and horizontal lengths) of the final composite image is determined. Therefore, the control section 2 deletes the display of unnecessary imaging area information (guide 12i or 12h) and displays direction guidance information (arrow) indicating the imaging direction on the display section 6 (Step S168). Note that the display of the direction guidance information is performed using existing technology. Next, the control section 2 performs combining processing for combining the captured image with the current composite image, and displays the composite image on the display section 6 (Step S170). Then, the control section 2 judges whether or not the area within the guide has been completely captured (Step S172). When judged that the area within the guide has not been completely captured (NO at Step S172), the control section 2 returns to Step S170. Hereafter, until the area is completely captured, the control section 2 repeatedly performs the combining processing and the display of the composite image.

FIG. 13E shows a display example immediately after the imaging device 1 is stopped at the furthest position in the vertical direction and its movement in the opposite horizontal direction is started. At this stage, the aspect ratio desired by the user has been determined. Therefore, the guide 12i or 12h has been deleted, and the direction guidance information (arrow) 14 indicating the movement direction of the imaging device 1 has been displayed. FIG. 13F shows a display example immediately after the imaging device 1 is moved upward at the left end. At this stage, it is clear that the imaging will be completed when the imaging device 1 is moved to the uncaptured area 15.

Next, when judged that the area within the guide has been completely captured (YES at Step S172), the control section 2 ends the imaging (Step S174), and after recording the captured image in the storage section 7 (Step S176), returns to Step S130 in FIG. 11 to repeat the above-described processing.

FIG. 13G shows a display example immediately after the imaging is completed, in which the live-view image 10 has reached the upper right end of the imaging area, and the imaging area has been completely captured.

At Step S130, when judged that the imaging mode is not a wide imaging mode (NO at Step S130), the control section 2 controls operations in accordance with the flowchart shown in FIG. 4, as in the case of the above-described first embodiment.

According to the above-described third embodiment, the final imaging area having a predetermined aspect ratio is calculated based on an imaging area from the start of the imaging up to the current point, and imaging area information (guide) indicating the final imaging area having the predetermined aspect ratio is displayed on the display section 6. Therefore, a composite imaging with a wide viewing angle can be captured with a predetermined aspect ratio, simply by imaging being performed while the imaging device 1 is moved in accordance with guide display indicating the imaging area. As a result, images having a uniform aspect ratio can be easily generated.

In addition, in the third embodiment, an imaging area from the start of imaging up to the current point is calculated based on the movement direction and the movement amount of the imaging device 1. Therefore, the user can acquire an imaging area from the start of imaging up to the current point by simply moving the imaging device 1 as usual.

Moreover, in the third embodiment, when the movement direction of the imaging device 1 in its initial movement started at the beginning of imaging is substantially linear and a substantially horizontal or vertical direction, a reference movement amount in the direction perpendicular to the substantially horizontal or vertical direction, which is used to identify the final imaging area having a predetermined aspect ratio, is calculated based on the movement amount. Therefore, the final imaging area having a predetermined aspect ratio can be identified simply by the user moving the imaging device 1 as usual.

Furthermore, in the third embodiment, a position to be the center of a composite image is specified at the start of the imaging, and the reference movement amount is calculated based on a movement amount from the specified position during the wide imaging. As a result of this configuration, a subject to be placed in the center of an ultimately generated composite image can be specified at the beginning, and whereby the composition of the composite image can be easily decided.

Also, according to the above-described first to third embodiments, when the orientation of the imaging device 1 is detected and if the imaging device 1 is detected to be horizontally oriented, the reference movement amount is calculated based on an aspect ratio that forms a horizontally long area. On the other hand, when the imaging device 1 is detected to be vertically oriented, the reference movement amount is calculated based on an aspect ratio that forms a vertically long area. Therefore, an aspect ratio that forms a horizontally long area or an aspect ratio that forms a vertically long area can be automatically selected based on how the imaging device 1 is held.

Moreover, when a plurality of guides indicating imaging areas are displayed, whether or not an aspect ratio for the composite imaging performed by the movement of the imaging device 1 has been determined is further judged. Therefore, various processing can be performed along with the determination of an aspect ratio.

Furthermore, when it is judged that an aspect ratio for composite imaging has been determined, unnecessary guide display for the imaging area is deleted from the display section 6. Therefore, erroneous imaging with an undesired aspect ratio can be prevented.

Still further, an aspect ratio for composite imaging is judged to be determined when the initial movement started at the beginning of the imaging is stopped and movement in a substantially perpendicular direction started thereafter is stopped, or when movement in a substantially perpendicular direction is again started after this stop. Therefore, whether or not an aspect ratio has been determined can be easily judged.

Yet still further, when it is judged that an aspect ratio for composite imaging has been determined, guide display is performed which guides the imaging device in a movement direction where uncaptured areas can be efficiently captured. Therefore, composite imaging can be efficiently performed.

Yet still further, when the movement direction of the initial movement started at the beginning of imaging is the opposite direction of a predetermined direction, image processing differing from normal image processing is further performed on captured images. Therefore, image processing on captured images can be easily performed simply by the movement direction of the imaging device 1 being changed.

Yet still further, guide display indicating an imaging area is displayed overlapping with combined captured images and the currently captured live-view image. Therefore, the status of imaging can be easily confirmed.

Yet still further, display explaining an aspect ratio which corresponds to guide display indicating an imaging area is displayed overlapping with the guide display. Therefore, the user's desired aspect ratio can be instantly confirmed.

Yet still further, since a predetermined aspect ratio is set, guide display indicating the user's desired aspect ratio can be displayed.

While the present invention has been described with reference to the preferred embodiments, it is intended that the invention be not limited by any of the details of the description therein but includes all the embodiments which fall within the scope of the appended claims.

What is claimed is:

1. An imaging device comprising:
 a display section; and
 a processor which is operable as:
  a combining section which performs consecutive imaging while the imaging device is being moved in vertical and horizontal directions, and generates a wide range image by combining a plurality of images acquired by the consecutive imaging;
  an identifying section which identifies an imaging area that is sequentially changed according to movement of the imaging device from a start of the imaging up to a current point, during the consecutive imaging by the combining section;
  a calculating section which sequentially calculates a final imaging area which includes the imaging area up to the current point and which has a predetermined aspect ratio, based on the imaging area which is sequentially changed up to the current point and which has been identified by the identifying section;
  a display control section which sequentially updates and displays, on the display section, imaging area information indicating the final imaging area, which is sequentially changed, having the predetermined aspect ratio which has been calculated by the calculating section, during the consecutive imaging by the combining section;
  a movement amount detecting section which detects a movement amount of the imaging device; and
  a direction detecting section which detects a movement direction of the imaging device,
  wherein the identifying section identifies the imaging area from the start of the imaging up to the current point based on the movement amount of the imaging device detected by the movement amount detecting section and the movement direction of the imaging device detected by the direction detecting section, and
  wherein the calculating section calculates, when the movement direction of an initial movement started at a beginning of the imaging which has been detected by the direction detecting section is linear in a horizontal or vertical direction, a reference movement amount in a direction perpendicular to the horizontal or vertical direction which specifies the final imaging area having the predetermined aspect ratio, based on the movement amount of the movement that is linear in the horizontal or vertical direction which has been detected by the movement amount detecting section.

2. The imaging device according to claim 1, wherein the calculating section calculates the reference movement amount when the initial movement started at the beginning of the imaging is stopped, and the display control section displays, on the display section, the imaging area information based on the reference movement amount calculated by the calculating section.

3. The imaging device according to claim 1, wherein the calculating section calculates the reference movement amount when the initial movement started at the beginning of the imaging is stopped and then restarted in the perpendicular direction, and the display control section displays, on the display section, the imaging area information based on the reference movement amount calculated by the calculating section.

4. The imaging device according to claim 1, wherein the processor is further operable as:
   an orientation detecting section which detects an orientation of the imaging device,
   wherein the calculating section calculates the reference movement amount based on an aspect ratio that forms a laterally long area when the orientation of the imaging device is detected to be a horizontal orientation by the orientation detecting section, and calculates the reference movement amount based on an aspect ratio that forms a vertically long area when the orientation of the imaging device is detected to be a vertical orientation.

5. The imaging device according to claim 1, wherein the calculating section calculates the reference movement amount based on an aspect ratio that forms a laterally long area when the movement direction of the initial movement started at the beginning of the imaging which has been detected by the direction detecting section is linear in the horizontal direction, and calculates the reference movement amount based on an aspect ratio that forms a vertically long area when the movement direction is linear in the vertical direction.

6. The imaging device according to claim 1, wherein the processor is further operable as:
   a determination judging section which judges whether an aspect ratio of a composite image that is acquired by movement of the imaging device has been determined, when the imaging area information is displayed on the display section by the display control section.

7. The imaging device according to claim 6, wherein the display control section deletes the imaging area information displayed on the display section when the determination judging section judges that the aspect ratio of the composite image has been determined.

8. The imaging device according to claim 7, wherein the determination judging section judges that the aspect ratio of the composite image has been determined when the direction detecting section detects that the initial movement started at the beginning of the imaging is stopped, restarted in the perpendicular direction, and then stopped, or stopped and again restarted in a perpendicular direction.

9. The imaging device according to claim 6, wherein the display control section displays, on the display section, guidance information that guides the imaging device in a movement direction where uncaptured areas are efficiently captured, when the determination judging section judges that the aspect ratio of the composite image has been determined.

10. The imaging device according to claim 1, wherein the processor is further operable as:
    an image processing section which performs image processing differing from normal image processing on the images, when the movement direction of the initial movement started at the beginning of the imaging which has been detected by the direction detecting section is an opposite direction of a predetermined direction.

11. The imaging device according to claim 1, wherein the processor is further operable as:
    a center position specifying section which specifies a position to be center of a composite image, at the start of the imaging,
    wherein the calculating section calculates the final imaging area having the predetermined aspect ratio based on an imaging area from the position specified by the center position specifying section to a current position which has been identified by the identifying section.

12. The imaging device according to claim 1, wherein the display control section displays a live-view image that is currently being captured and the imaging area information overlapping with the live-view image in full-screen on the display section.

13. The imaging device according to claim 1, wherein the display control section displays aspect ratio information explaining an aspect ratio corresponding to the imaging area information such that the aspect ratio information overlaps with the imaging area information.

14. The imaging device according to claim 1, wherein the processor is further operable as:
    a setting section which sets the predetermined aspect ratio.

15. An imaging method of an imaging device, the method comprising:
    performing consecutive imaging while the imaging device is being moved in vertical and horizontal directions, and generating a wide range image by combining a plurality of images acquired by the consecutive imaging;
    identifying an imaging area that is sequentially changed according to movement of the imaging device from a start of the imaging up to a current point, during the consecutive imaging;
    sequentially calculating a final imaging area which includes the imaging area up to the current point and which has a predetermined aspect ratio, based on the imaging area which is sequentially changed up to the current point and which has been identified;
    sequentially updating and displaying, on a display section, imaging area information indicating the final imaging area, which is sequentially changed, having the predetermined aspect ratio, during the consecutive imaging;
    detecting a movement amount of the imaging device; and
    detecting a movement direction of the imaging device,
    wherein the imaging area from the start of the imaging up to the current point is identified based on the detected movement amount of the imaging device and the detected movement direction of the imaging device, and
    wherein, when the detected movement direction of an initial movement started at a beginning of the imaging is linear in a horizontal or vertical direction, a reference movement amount in a direction perpendicular to the horizontal or vertical direction which specifies the final imaging area having the predetermined aspect ratio is calculated, based on the detected movement amount of the movement that is linear in the horizontal or vertical direction.

16. A non-transitory computer-readable storage medium having stored thereon a program that is executable by a computer in an imaging device, the program being executable by the computer to perform functions comprising:
    performing consecutive imaging while the imaging device is being moved in vertical and horizontal directions, and generating a wide range image by combining a plurality of images acquired by the consecutive imaging;

identifying an imaging area that is sequentially changed according to movement of the imaging device from a start of the imaging up to a current point, during the consecutive imaging;

sequentially calculating a final imaging area which includes the imaging area up to the current point and which has a predetermined aspect ratio, based on the imaging area which is sequentially changed up to the current point and which has been identified;

sequentially updating and displaying, on a display section, imaging area information indicating the final imaging area, which is sequentially changed, having the predetermined aspect ratio, during the consecutive imaging;

detecting a movement amount of the imaging device; and detecting a movement direction of the imaging device, wherein the imaging area from the start of the imaging up to the current point is identified based on the detected movement amount of the imaging device and the detected movement direction of the imaging device, and wherein, when the detected movement direction of an initial movement started at a beginning of the imaging is linear in a horizontal or vertical direction, a reference movement amount in a direction perpendicular to the horizontal or vertical direction which specifies the final imaging area having the predetermined aspect ratio is calculated, based on the detected movement amount of the movement that is linear in the horizontal or vertical direction.

* * * * *